United States Patent
Beijbom et al.

(10) Patent No.: US 6,819,251 B2
(45) Date of Patent: Nov. 16, 2004

(54) MEASURING DEVICE

(75) Inventors: Peter Beijbom, Uardavägen (SE);
Niklas Johansson, Amiralsgatan (SE);
Christian Norman, Rörbäck (SE)

(73) Assignee: Hedson Technologies AB, Arlov (SE)

( * ) Notice: Subject to any disclaimer, the term of this patent is extended or adjusted under 35 U.S.C. 154(b) by 0 days.

(21) Appl. No.: 10/172,644

(22) Filed: Jun. 14, 2002

(65) Prior Publication Data
US 2003/0156035 A1 Aug. 21, 2003

(30) Foreign Application Priority Data
Feb. 18, 2002 (SE) ................................................ 0200486

(51) Int. Cl.[7] .............................................. G08B 21/00
(52) U.S. Cl. ...................... 340/618; 340/612; 340/620; 73/304 C
(58) Field of Search ................................ 340/618, 603, 340/612, 620; 73/304 C, 290 R

(56) References Cited

U.S. PATENT DOCUMENTS

| | | | |
|---|---|---|---|
| 2,789,435 A | | 4/1957 | Weiss |
| 5,001,927 A | * | 3/1991 | LaCava et al. ........... 73/304 C |
| 5,102,503 A | * | 4/1992 | Silinski et al. ............... 202/83 |
| 5,463,378 A | * | 10/1995 | Gibb .......................... 340/618 |
| 6,159,345 A | * | 12/2000 | Donnelly et al. .............. 203/1 |
| 6,293,145 B1 | * | 9/2001 | Wallrafen ................. 73/304 C |
| 6,457,355 B1 | * | 10/2002 | Philipp ..................... 73/304 C |
| 6,481,276 B1 | * | 11/2002 | Neuhaus et al. .......... 73/304 C |
| 6,490,920 B1 | * | 12/2002 | Netzer ...................... 73/304 C |
| 6,568,264 B2 | * | 5/2003 | Heger ........................ 340/618 |

FOREIGN PATENT DOCUMENTS

FR 2394334 1/1979

* cited by examiner

*Primary Examiner*—Nina Tong
(74) *Attorney, Agent, or Firm*—Tarolli, Sundheim, Covell & Tummino L.L.P.

(57) ABSTRACT

A recovery device (1) includes a container (11) for recovering pure solvent (10) A measuring device (12) includes a capacitive detector (13) which is provided to signal if the container (11) is not empty nor substantially empty when one tries to start operation of the recovering pure solvent (10).

16 Claims, 2 Drawing Sheets

MEASURING DEVICE

FIELD OF INVENTION

The present invention relates to a measuring device at recovery devices, wherein the recovery device is designed for location locally in workshops or similar premises, in which contaminated or impure solvent originates because objects in the workshops or similar premises are cleaned by means of a solvent. The recovery device includes a container for contaminated or impure solvent, a heating device for heating contaminated solvent present in the container, such that solvent vapours are generated in the container, and a condenser for condensing solvent vapours which are fed from the container to the condenser for condensing the solvent vapours therein to pure solvent which is fed to a container for pure solvent.

BACKGROUND OF THE INVENTION

At recovery devices for recovering pure solvent (i.e., thinner from contaminated solvent, impure solvent, colorants, or oils, etc.), the recovered pure solvent is fed to a container which will be emptied when it is full. However, it has happened that the recovery device is started for recovering pure solvent without previously having emptied or substantially emptied the container with pure solvent. This has resulted in that the container has been overfilled such that solvent has run out. This is quite unacceptable because many solvents, e.g. thinner, as well as their vapours are injurious to health.

SUMMARY OF INVENTION

The object of the present invention is to eliminate this problem or at least to acknowledge the problem such that the required measures can be taken. Since the measuring device comprises a capacitive detector which is provided to detect or sense if the container for pure solvent is empty or substantially empty or not, and to signal if the container is not empty or substantially empty, it is possible, without movable components, with simple, precise and reliable means which also withstand aggressive solvents, to generate warning signals or even block starting if one tries to start the recovery device without first having emptied or substantially emptied the container for pure solvent. The capacitive detector further permits detection of difficult to detect liquids such as e.g. thinner.

BRIEF DESCRIPTION OF THE DRAWINGS

The invention will be further described below with reference to the accompanying drawings, in which FIG. 1 schematically illustrates a recovery device for recovering solvents and equipped with a measuring device according to the invention.

DESCRIPTION OF THE INVENTION

Figure 1:
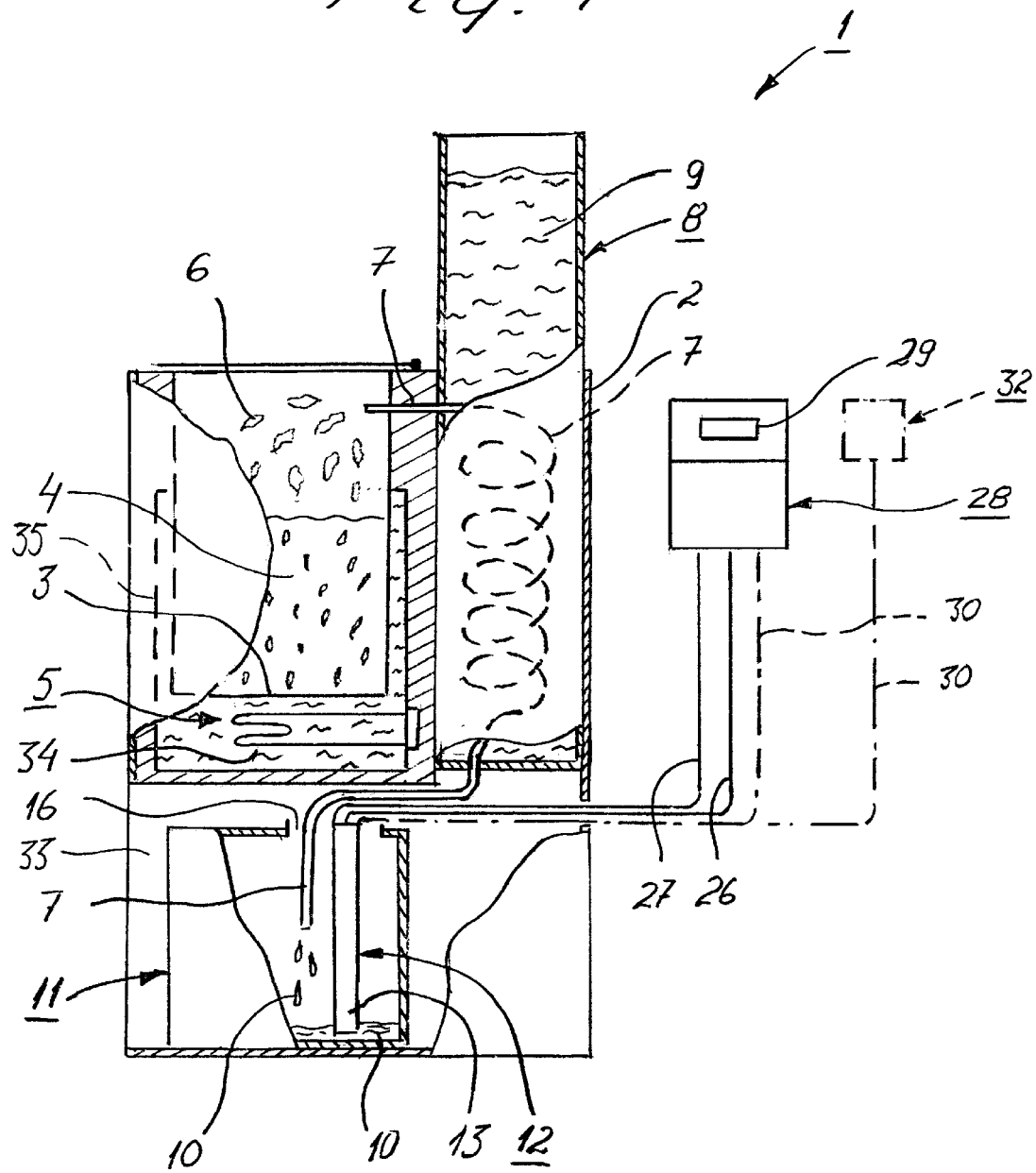

The recovery device 1 illustrated in FIG. 1 is designed and adapted for location locally in workshops or similar premises in which impure solvents originate because objects are cleaned by means of solvents. This recovery device 1 comprises an outer casing 2 with a container 3 into which contaminated solvent 4 can be poured or otherwise added and which thereafter can be sealed at the top. A heating device 5 is provided to heat contaminated solvent 4 in the container 3 such that solvent vapours 6 are generated therein. A conduit 7 is connected with the inner parts of the container 3 for allowing solvent vapours 6 to flow from the container 3 to a condenser 8. The condenser 8 contains a coolant 9, e.g. cooling water, and the conduit 7 extends downwards therein from above such that the solvent vapours 6 in the conduit 7 are cooled and transform from the vapour phase to liquid phase. Hereby, pure solvent 10 is generated in the conduit 7 and said conduit is inserted into or otherwise connected to a container 11 in which the pure solvent 10 is collected. When the container 11 is filled, it is emptied to give room for more pure solvent 10.

In order to prevent or at least make it possible to prevent that the container 11 might be overfilled, the recovery device 1 comprises a measuring device 12 with a capacitive detector 13 which is provided to signal if the container 11 is not empty nor substantially empty when one tries to start operation of the recovery device 1 for recovering pure solvent 10.

The capacitive detector 13 may include an elongated, tubular outer member 14 and, provided longitudinally therein, an inner member 15. The outer member 14 may with its inner member 15 be lowerable into the container 11 through an upper opening 16 therein, such that lower parts 17 and 18 respectively, of the outer and inner members 14 and 15 respectively, will be located at the bottom 19 of the container 11 or adjacent thereto, and the capacitive detector 13 is preferably provided to measure the capacitance primarily between said lower parts 17, 18.

The diameter or similar of the lower parts 18 of the inner member 15 is greater than for upper parts 20 of the inner member 15, which means that a lower gap 21 between the lower parts 18, 17 of the inner member 15 and the outer member 14 becomes substantially narrower than an upper gap 22 between said upper parts 20 of the inner member 15 and upper parts 23 of the outer member 14.

Since the lower gap 21 is narrow, it is possible to attain that the capacitive detector 13 becomes particularly sensible at its lower parts, i.e. down below in the container 11, and it is further possible to detect solvents which are particularly difficult to detect.

Figure 2:
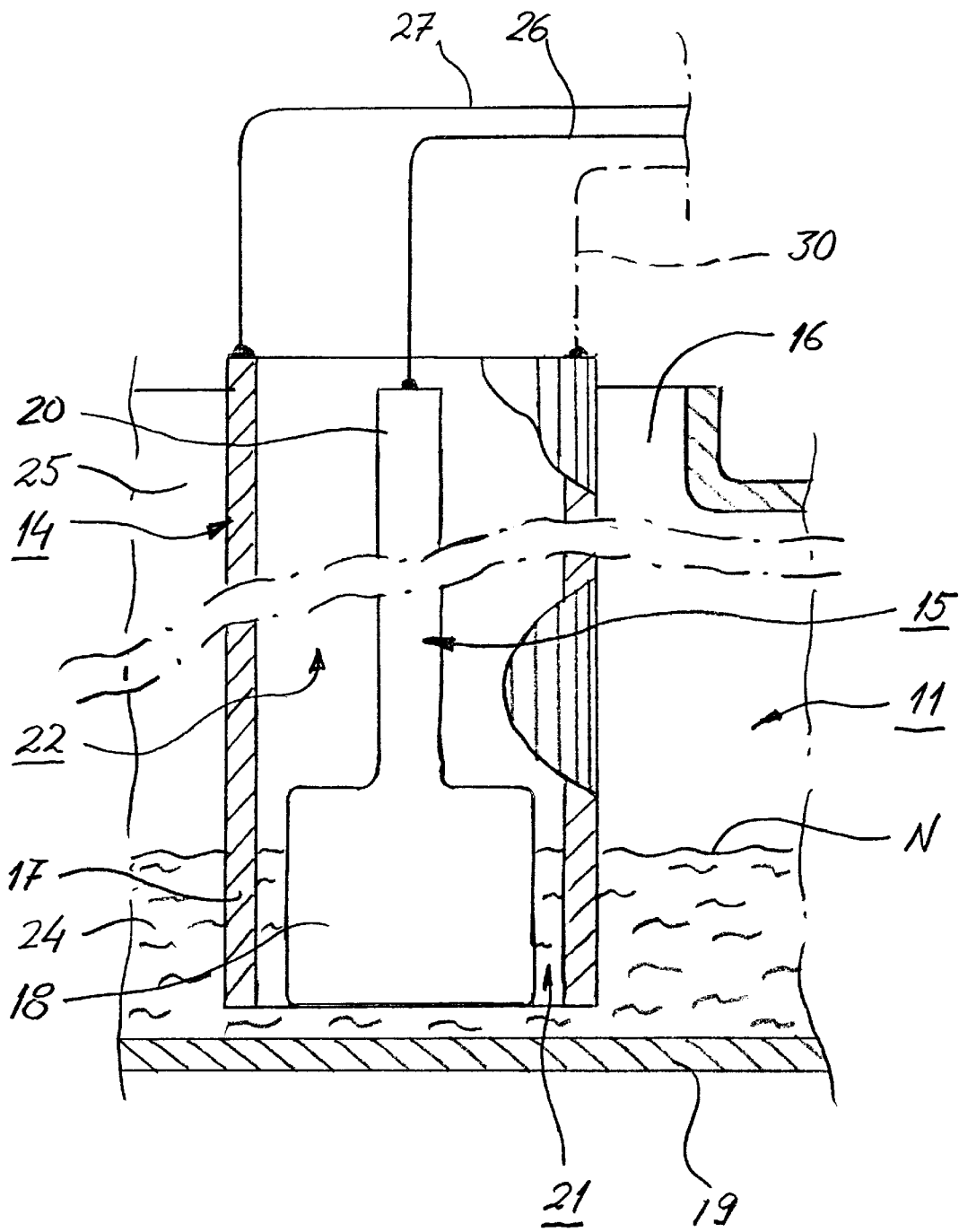
FIG. 2 is an enlarged section of the measuring device according to the invention.

With this or similar design, the capacitive detector 13 operates as a level guard for measuring if pure solvent 10 in the container 11 exceeds a certain level (e.g. level N in FIG. 2).

The capacitive detector 13 is preferably non-linear and has in lower parts 24 of the container 11 a substantially better sensitivity than in upper parts 25 thereof. This can e.g. be accomplished by designing the capacitive detector 13 as defined with a substantially narrower lower gap 21 than an upper gap 22.

The outer and inner members 14, 15 respectively, of the capacitive detector 13, is through electric cables 26, 27 connected to an electric control system 28 forming part of the recovery device 1. Those electric cables 26, 27 are provided to supply electric power to the capacitive detector 13 and they may also be provided to feed signals from said capacitive detector 13 to the control system 28, but this signalling may eventually occur through a separate signalling circuit 30. The electric control system 28 allows, inter alia, activation and deactivation of the operation of the recovery device 1, and a viewing screen or display 29 showing e.g. different actual operating modes may be connected thereto.

The capacitive detector 13 is preferably provided to feed a signal to the control system 28 in order to prevent start of operation of the recovery device 1 when the container 11 is not empty nor substantially empty. Simultaneously, the control system 28 might signal to the display 29 to indicate with text (e.g. "empty the container") and/or with symbols that the container 11 must be emptied. When the container 11 is empty, the control system 28 permits start of operation of the recovery device 1.

As an alternative to using the signal from the capacitive detector 13 for preventing start of operation of the recovery device 1 if the container 11 is not empty, it may eventually be used for starting or activating a signal device 32 which can be brought to generate a visual and/or acoustic warning signal if one tries to start operation of the recovery device 1 when the container 11 is not empty nor substantially empty.

As is apparent from FIG. 1, the container 3 and the condenser 8 may be located beside each other in the outer casing 2. Beneath the container 3 there may be provided a space 33 for the container 11 and this space 33 may be open or openable at a front side such that the container 11 can be removed from the outer casing 2 for emptying.

The recovery device 1 is preferably mobile so that it when necessary can be moved by personnel in the premises where it is used. It can be used in connection with different types of solvent, e.g. thinner, which has been contaminated e.g. by having used it for cleaning spray guns adapted for painting motor vehicles or other objects.

The recovery device 1 may comprise immersion heaters 34 for heating oil or any other medium in an outer container 35 surrounding the container 11, but the recovery device 1 may be of a totally different type than the one illustrated in FIG. 1.

What is claimed is:

1. A recovery device (1) recovering a solvent (4) contaminated by use in cleaning an object, said recovery device (1) comprising:
    a first container (3) for the contaminated solvent (4);
    a heating device (5) for heating the contaminated solvent (4) present in said first container (3) and generating solvent vapours (6) in said first container (3);
    a condenser (8) for condensing solvent vapours (6) which are fed from said first container (3) to said condenser (8);
    a second container (11) for purified solvent (10) from solvent vapours (6) condensed by said condenser (8); and
    a measuring device (12) having a capacitive detector (13) for generating a signal acting on said recovery device (1) to prevent start of recovery of additional purified solvent (10) by said recovery device (1) when said second container (11) contains an amount of purified solvent (10).

2. The device according to claim 1, characterized in that said capacitive detector (13) operates as a level guard for measuring whether the purified solvent (10) in said second container (11) exceeds a predetermined level (N).

3. A recovery device (1) recovering a solvent (4) contaminated by use in cleaning an object, said recovery device (1) comprising:
    a first container (3) for the contaminated solvent (4);
    a heating device (5) for heating the contaminated solvent (4) present in said first container (3) and generating solvent vapours (6) in said first container (3);
    a condenser (8) for condensing solvent vapours (6) which are fed from said first container (3) to said condenser (8);
    a second container (11) for purified solvent (10) from solvent vapours (6) condensed by said condenser (8); and
    a measuring device (12) having a capacitive detector (13) for generating a signal acting on said recovery device (1) to prevent start of recovery of additional purified solvent (10) by said recovery device (1) when said second container (11) contains an amount of purified solvent (10),
    said capacitive detector (13) being a non-linear capacitive detector having greater sensitivity for the purified solvent (10) in a lower part (24) of said second container (11) than in an upper part (25) of said second container (11).

4. The device according to claim 3, characterized in that the signal is fed to a control system (28) in said recovery device (1) for preventing a start of operation of said recovery device (1) when said second container (11) contains purified solvent (10).

5. The device according to claim 3, characterized in that the signal is fed to a signal device (32) such that said signal device (32) generates a warning signal if said recovery device (1) starts operation (10).

6. The device according to claim 3, characterized in that the signal is fed to a display (29) for indicating that said second container (11) contains purified solvent (10).

7. A recovery device (1) recovering a solvent (4) contaminated by use in cleaning an object, said recovery device (1) comprising:
    a first container (3) for the contaminated solvent (4);
    a heating device (5) for heating the contaminated solvent (4) present in said first container (3) and generating solvent vapours (6) in said first container (3);
    a condenser (8) for condensing solvent vapours (6) which are fed from said first container (3) to said condenser (8);
    a second container (11) for purified solvent (10) from solvent vapours (6) condensed by said condenser (8); and
    a measuring device (12) having a capacitive detector (13) for generating a signal acting on said recovery device (1) to prevent start of recovery of additional purified solvent (10) by said recovery device (1) when said second container (11) contains an amount of purified solvent (10),
    said capacitive detector (13) including an elongated, tubular outer member (14) and an inner member (15) within said outer member (14), said outer member (14) being lowerable into said second container (11) such that a lower part (17) of said outer member (14) and a lower part (18) of said inner member (15) are located adjacent a bottom part (19) of said second container (11) such that said capacitive detector (13) measures capacitance between said lower parts (17, 18) of said outer and inner members (14, 15).

8. The device according to claim 7, characterized in that the signal is fed to a control system (28) in said recovery device (1) for preventing a start of operation of said recovery device (1) when said second container (11) contains purified solvent (10).

9. The device according to claim 7 characterized in that the signal is fed to a signal device (32) such that said signal device (32) generates a warning signal if said recovery device (1) starts operation when said second container (11) contains purified solvent (10).

10. The device according to claim 7 characterized in that the signal is fed to a display (29) for indicating that said second container (11) contains purified solvent (10).

11. A recovery device (1) for recovering a solvent (4) contaminated by use in cleaning an object, said recovery device (1) comprising:

a first container (3) for the contaminated solvent (4);

a heating device (5) for heating the contaminated solvent (4) present in said first container (3) and generating solvent vapours (6) in said first container (3);

a condenser (8) for condensing solvent vapours (6) which are fed from said first container (3) to said condenser (8);

a second container (11) for pure solvent (10) from solvent vapours (6) condensed by said condenser (8); and a measuring device (12) having a capacitive detector (13) for generating a signal acting on said recovery device (1) to prevent start of recovery of additional purified solvent (10) by said recovery device (1) when said second container (11) contains an amount of purified solvent (10), said capacitive detector (13) including an elongated, tubular outer member (14) and an inner member (15) within said outer member (14), said outer member (14) being lowerable into said second container (11) such that a lower part (17) of said outer member (14) and a lower part (18) of said inner member (15) are located adjacent a bottom part (19) of said second container (11) such that said capacitive detector (13) measures capacitance between said lower parts (17, 18) of said outer and inner members (14, 15), a lower gap (21) between said lower parts (17, 18) of said outer and inner members (14, 15) being narrower than an upper gap (22) between an upper part (20) of said outer member (14) and an upper part (23) of said inner member (15).

12. The device according to claim 11, characterized in that the signal is fed to a control system (28) in said recovery device (1) for preventing a start of operation of said recovery device (1) when said second container (11) contains purified solvent (10).

13. The device according to claim 11 characterized in that the signal is fed to a signal device (32) such that said signal device (32) generates a warning signal if said recovery device (1) starts operation when said second container (11) contains purified solvent (10).

14. The device according to claim 11 characterized in that the signal is fed to a display (29) for indicating that said second container (11) contains purified solvent (10).

15. A recovery device (1) recovering a solvent (4) contaminated by use in cleaning an object, said recovery device (1) comprising:

a first container (3) for the contaminated solvent (4);

a heating device (5) for heating the contaminated solvent (4) present in said first container (3) and generating solvent vapours (6) in said first container (3);

a condenser (8) for condensing solvent vapours (6) which are fed from said first container (3) to said condenser (8);

a second container (11) for purified solvent (10) from solvent vapours (6) condensed by said condenser (8); and a measuring device (12) having a capacitive detector (13) for generating a signal acting on said recovery device (1) to prevent start of recovery of additional purified solvent (10) by said recovery device (1) when said second container (11) contains an amount of purified solvent (10), said first container (3) and said condenser (8) being located beside each other in an outer casing (2) of said recovery device (1), said first container (3) and said outer casing (2) defining a space (33) for said second container (11), said second container (11) being removable from said space (33) for emptying said second container (11).

16. A recovery device (1) recovering a solvent (4) contaminated by use in cleaning an object, said recovery device (1) comprising:

a first container (3) for the contaminated solvent (4);

a heating device (5) for heating the contaminated solvent (4) present in said first container (3) and generating solvent vapours (6) in said first container (3);

a condenser (8) for condensing solvent vapours (6) which are fed from said first container (3) to said condenser (8);

a second container (11) for purified solvent (10) from solvent vapours (6) condensed by said condenser (8); and a measuring device (12) having a capacitive detector (13) for generating a signal acting on said recovery device (1) to prevent start of recovery of additional purified solvent (10) by said recovery device (1) when said second container (11) contains an amount of purified solvent (10), said recovery device (1) being a mobile device which, when required, can be moved by an operator, said recovery device (1) recovering solvent in the form of purified thinner from contaminated thinner originating from cleaning of paint spray guns.

* * * * *

UNITED STATES PATENT AND TRADEMARK OFFICE
CERTIFICATE OF CORRECTION

PATENT NO. : 6,819,251 B2
DATED : November 16, 2004
INVENTOR(S) : Peter Beijbom, Niklas Johansson and Christian Norman It is certified that error appears in the above-identified patent and that said Letters Patent is hereby corrected as shown below:

Column 4,
Line 22, after "operation" insert -- when said second container (11) contains purified solvent --.

Signed and Sealed this

Third Day of May, 2005

JON W. DUDAS
*Director of the United States Patent and Trademark Office*